(12) United States Patent
Iyer et al.

(10) Patent No.: US 7,281,305 B1
(45) Date of Patent: Oct. 16, 2007

(54) METHOD OF ATTACHING A CAPACITOR TO A FEEDTHROUGH ASSEMBLY OF A MEDICAL DEVICE

(75) Inventors: Rajesh V. Iyer, Eden Prairie, MN (US); Susan A. Tettemer, Fridley, MN (US); John P Tardiff, Corcoran, MN (US); Shawn D. Knowles, Saint Francis, MN (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

(21) Appl. No.: 11/278,291

(22) Filed: Mar. 31, 2006

(51) Int. Cl.
*H01G 7/00* (2006.01)

(52) U.S. Cl. .................... 29/25.42; 29/593; 29/609; 29/832; 29/852; 29/855; 29/858; 75/414; 361/302; 361/306.2; 361/307; 427/79; 427/80

(58) Field of Classification Search ............... 29/25.42, 29/592.1, 609, 832, 852, 855, 858, 302, 306.2, 29/307; 361/311–313, 302, 306.2, 307; 75/414; 427/79, 80

See application file for complete search history.

(56) References Cited

U.S. PATENT DOCUMENTS

| 4,424,551 | A | 1/1984 | Stevenson et al. |
| 5,333,095 | A | 7/1994 | Stevenson et al. |
| 5,406,444 | A | 4/1995 | Selfried et al. |
| 5,650,759 | A | 7/1997 | Hittman et al. |
| 6,031,710 | A * | 2/2000 | Wolf et al. ................. 361/302 |
| 6,453,551 | B1 | 9/2002 | Nordquist et al. |
| 6,519,133 | B1 | 2/2003 | Eck et al. |
| 6,643,903 | B2 * | 11/2003 | Stevenson et al. ......... 29/25.42 |
| 6,778,040 | B2 | 8/2004 | Kim |
| 2003/0071016 | A1* | 4/2003 | Shih et al. .................... 216/54 |
| 2004/0257747 | A1 | 12/2004 | Stevenson et al. |

OTHER PUBLICATIONS

"Interference between GSM mobile phones and pace-makers: in vitro evaluation of interaction mechanisms"; Angeloni, A.; Barbaro, B.; Bartolini, P.; Calcagnini, G.; Censi, F.; Engineering in Medicine and Biology Society, 2001. Proceedings of the 23rd Annual International Conference of the IEEE vol. 4; Oct. 25-28, 2001; pp. 3985-3988, vol. 4.*

* cited by examiner

*Primary Examiner*—Paul D. Kim
(74) *Attorney, Agent, or Firm*—Carol F. Barry; Steve Bauer

(57) ABSTRACT

A method for attaching a capacitor to the feedthrough assembly of a medical device having a terminal pin comprises threading a first washer over the terminal pin, and placing a body of epoxy in contact with the first washer. The capacitor is positioned over the terminal pin such that the first washer and the body of epoxy are between the lower surface of the capacitor and a support surface. The body of epoxy is cured to couple the capacitor to the insulating structure. During curing, the body of epoxy is substantially confined between the upper surface and the lower surface by the ferrule, the insulating structure, the capacitor, and the first washer.

11 Claims, 7 Drawing Sheets

METHOD OF ATTACHING A CAPACITOR TO A FEEDTHROUGH ASSEMBLY OF A MEDICAL DEVICE

TECHNICAL FIELD

This invention relates generally to implantable medical devices and, more particularly, to a filtered feedthrough assembly for use with an implantable medical device.

BACKGROUND OF THE INVENTION

Cardiac pacemakers and other such implantable medical devices (e.g., cochlear implants, defibrillators, neurostimulators, active drug pumps, etc.) typically comprise a hermetically sealed container and a feedthrough assembly having one or more terminals (e.g., niobium pins) that provide conductive paths from the interior of the device to one or more lead wires exterior to the device. In general, such feedthrough assemblies comprise a ferrule that is fixedly coupled (e.g., welded) to a container and an insulating structure disposed within the ferrule. The insulating structure may include joint-insulator sub-assemblies, each of which is disposed around a different terminal pin. For example, the insulating structure may include one or more braze joints, each of which comprises an insulator ring (e.g., glass, ceramic, etc.) that insulates the pin from the ferrule, a pin-insulator braze (e.g., gold) that couples the insulating ring to the pin, and an insulator-ferrule braze (e.g., gold) that couples the insulating ring to the ferrule. When the medical device is implanted, the braze joints may be exposed to body fluids. It is thus important that each of the braze joints forms a hermetic seal between the ferrule and its respective terminal pin. To ensure that a satisfactory seal has been formed, a gas may be introduced through an aperture provided through a wall of the ferrule proximate the braze joint or joints. The aperture is then plugged, and the feedthrough assembly is externally monitored for the gas by way of, for example, a mass spectrometer.

To reduce the effects of stray electromagnetic interference (EMI) signals that may be collected by lead wires coupled to the feedthrough terminal pins, it is known to attach a discoidal capacitor to the feedthrough assembly that permits passage of relatively low frequency electrical signals along the terminal pin or pins while shunting undesired high frequency interference signals to the device's container. Typically, the attachment of such a capacitor includes the thermal curing of one or more non-conductive epoxy preforms to physically couple the capacitor to the insulating structure of the feedthrough.

Although feedthrough filter capacitor assemblies of the type described above perform satisfactorily, the installation of such filter capacitor assemblies poses certain problems related to the curing of the epoxy preforms. For example, the epoxy preforms may wick into the annular cavities provided between the capacitor and the terminal pins during curing and thus occupy space that should be filled by a conductive material (e.g., epoxy, solder, etc.). This results in a degraded electrical connection between the terminal pins and the capacitors. Additionally, the non-conductive epoxy preforms may seep into the insulating structure and cover cracks that have formed through the braze joint. This may prevent gas from being detected during leak testing and, therefore, may create the impression that a satisfactory hermetic seal has been formed when, in fact, one has not.

Considering the above, it should be appreciated that it would be desirable to provide a filtered feedthrough assembly utilizing an improved capacitor attachment technique that prevents the undesired travel of non-conductive epoxy. Furthermore, other desirable features and characteristics of the present invention will become apparent from the subsequent detailed description of the invention and the appended claims, taken in conjunction with the accompanying drawings and this background of the invention.

SUMMARY OF THE INVENTION

A method for attaching a capacitor to the feedthrough assembly of a medical device is provided. The feedthrough assembly comprises a ferrule configured to be coupled to the medical device and an insulating structure disposed within the ferrule for insulatively guiding at least one terminal pin through the ferrule. The method comprises threading a first washer over the terminal pin, and placing a body of epoxy in contact with the first washer. The capacitor is positioned over the terminal pin such that the first washer and the body of epoxy are between the capacitor and the insulating structure, and the epoxy preform is cured to couple the capacitor to the insulating structure.

A filtered feedthrough assembly having at least one terminal pin therethrough is also provided. The feedthrough assembly comprises a ferrule having a cavity therethrough for receiving the terminal pin, and insulating structure having an upper surface. The insulating structure is disposed within the cavity and around the terminal pin for electrically isolating the pin from the ferrule. A capacitor is disposed around the pin and electrically coupled thereto. The capacitor has a lower surface that is disposed proximate the upper surface, and at least one washer is disposed between the upper surface and the lower surface. To attach the capacitor to the insulating structure, a body of epoxy is substantially confined between the upper surface and the lower surface by the ferrule, the insulating structure, the capacitor, and the at least one washer.

BRIEF DESCRIPTION OF THE DRAWINGS

The following drawings are illustrative of particular embodiments of the invention and therefore do not limit the scope of the invention, but are presented to assist in providing a proper understanding. The drawings are not to scale (unless so stated) and are intended for use in conjunction with the explanations in the following detailed descriptions. The present invention will hereinafter be described in conjunction with the appended drawings, wherein like reference numerals denote like elements, and.

DETAILED DESCRIPTION OF THE EXEMPLARY EMBODIMENT

The following description is exemplary in nature and is not intended to limit the scope, applicability, or configuration of the invention in any way. Rather, the following description provides a convenient illustration for implementing an exemplary embodiment of the invention. Various changes to the described embodiment may be made in the function and arrangement of the elements described herein without departing from the scope of the invention.

Figure 1:
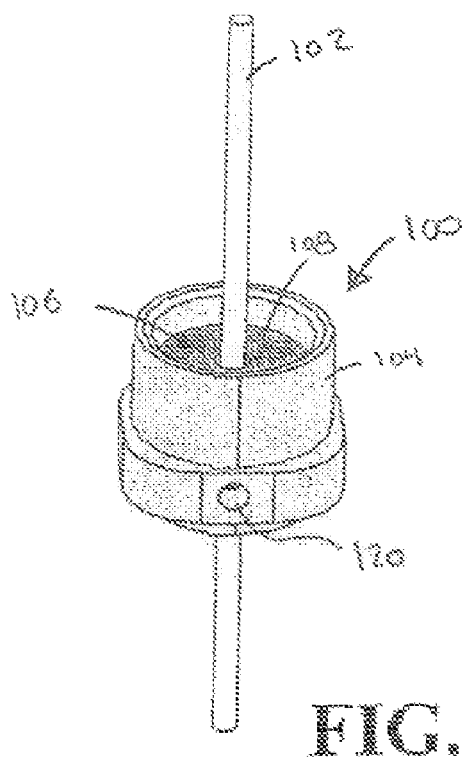
FIGS. 1 and 2 are isometric and cross-sectional views, respectively, of a known unipolar (single pin) feedthrough assembly prior to attachment of a discrete discoidal capacitor.
Figure 2:
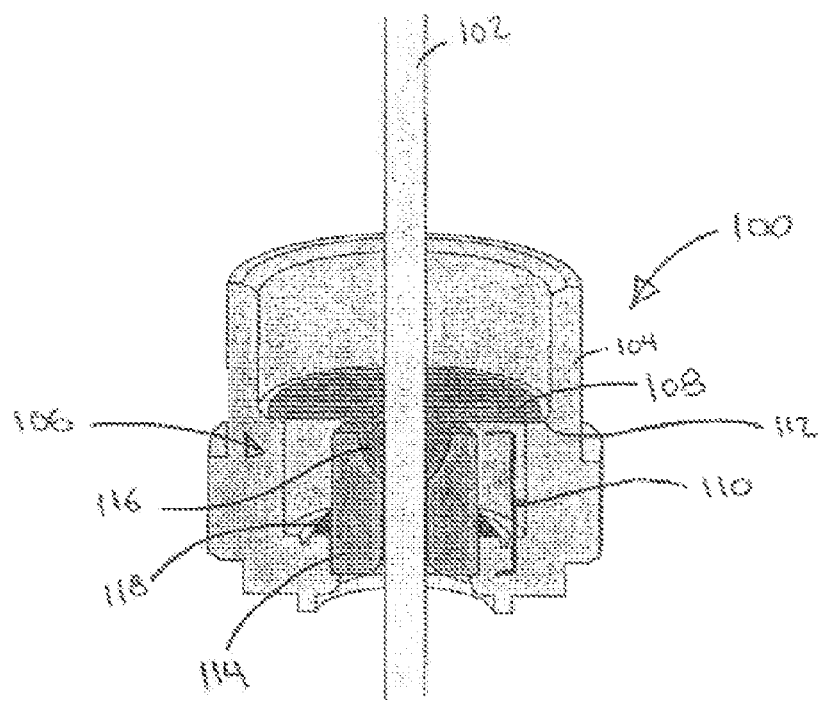

FIGS. 1 and 2 are isometric and cross-sectional views, respectively, of a known unipolar (single pin) feedthrough assembly 100 having a terminal pin 102 therethrough. Assembly 100 comprises a generally cylindrical ferrule 104 having a cavity therethrough through which pin 102 passes. Ferrule 104 is made of an electrically conductive material (e.g., titanium alloy) and is configured to be fixedly coupled (e.g., welded) to the container of a medical device as described below in conjunction with FIG. 10. An insulating structure 106 is disposed within ferrule 104 to secure pin 102 relative to ferrule 104 and to electrically isolate pin 102 from ferrule 104. Insulating structure 106 comprises a supporting structure 108 and a joint-insulator sub-assembly 110, both of which are disposed around terminal pin 102. As will be more fully described below, joint-insulator sub-assembly 110 acts as an insulative seal and may take the form of, for example, a braze joint. Supporting structure 108 is made of a non-conductive material (e.g., polyimide) and rests on an inner ledge 112 provided within ferrule 104. As will be seen, a discrete discoidal capacitor may be threaded over terminal pin 102 and fixedly coupled to supporting structure 108 to attach the capacitor to feedthrough assembly 100.

As can be seen in FIG. 2, braze joint 110 comprises three main components: an insulator ring 114 (e.g., glass, ceramic, etc.) that insulates pin 102 from ferrule 104, a pin-insulator braze 116 (e.g., gold) that couples insulating ring 114 to pin 102, and an insulator-ferrule braze 118 (e.g., gold) that couples insulating ring 114 to ferrule 104. Braze joint 110 is exposed along the underside of ferrule 104. When ferrule 104 is fixedly coupled to the container of the medical device, the lower portion of ferrule 104, and thus the lower portion of braze joint 110, may be exposed to body fluids. For this reason, it is important that braze joint 110 forms a hermetic seal between ferrule 104 and terminal pin 102. Braze joint 110 may be leak tested. To permit this test to be performed, an aperture 120 (FIG. 1) is provided through ferrule 104 to the inner annular cavity formed by the outer surface of braze joint 110, the lower surface of supporting structure 108, and the inner surface of ferrule 104. A gas is delivered through aperture 120 into the inner annular cavity, and aperture 120 is plugged. Preferably, a gas of low molecular weight (e.g., helium, hydrogen, etc.) is chosen that may penetrate small cracks in braze joint 110. Feedthrough 100 is then monitored for the presence of the gas proximate braze joint 110 by way of, for example, a mass spectrometer. If no gas is detected, it is concluded that braze joint 110 has formed a satisfactory seal.

Figure 3:
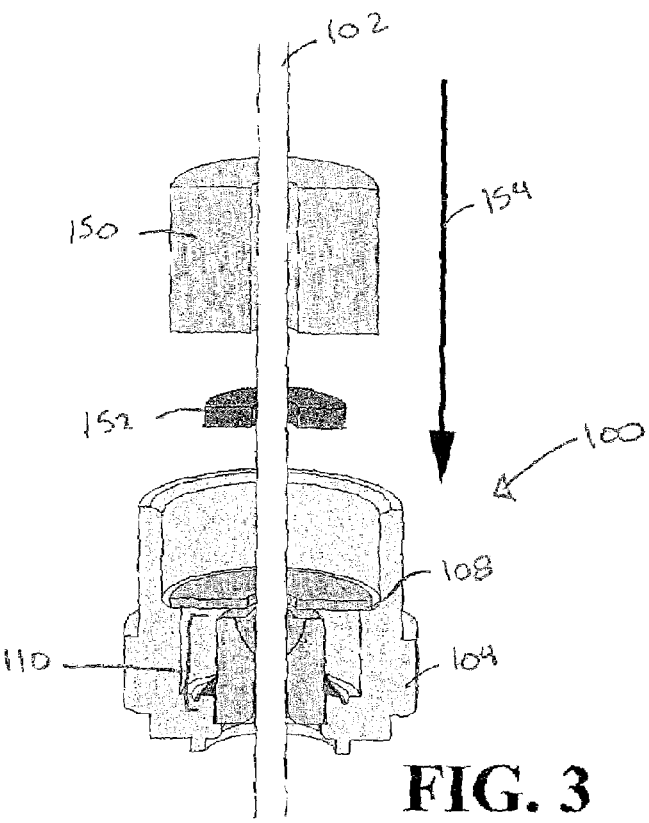
FIGS. 3-5 illustrate a prior art method of attaching a discrete discoidal capacitor to the feedthrough assembly shown in FIGS. 1 and 2.
Figure 4:
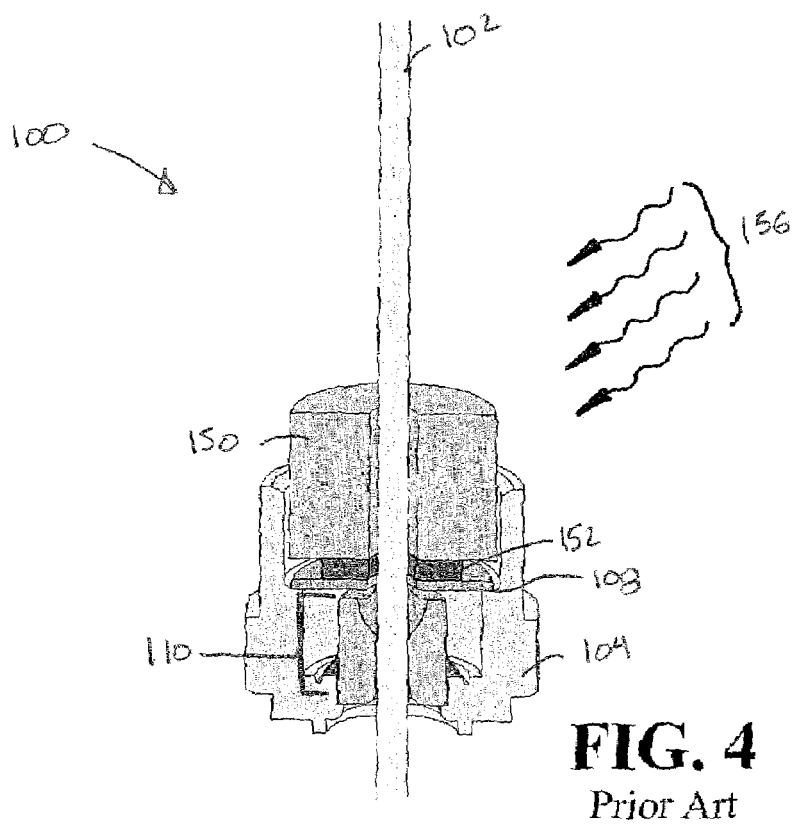
Figure 5:
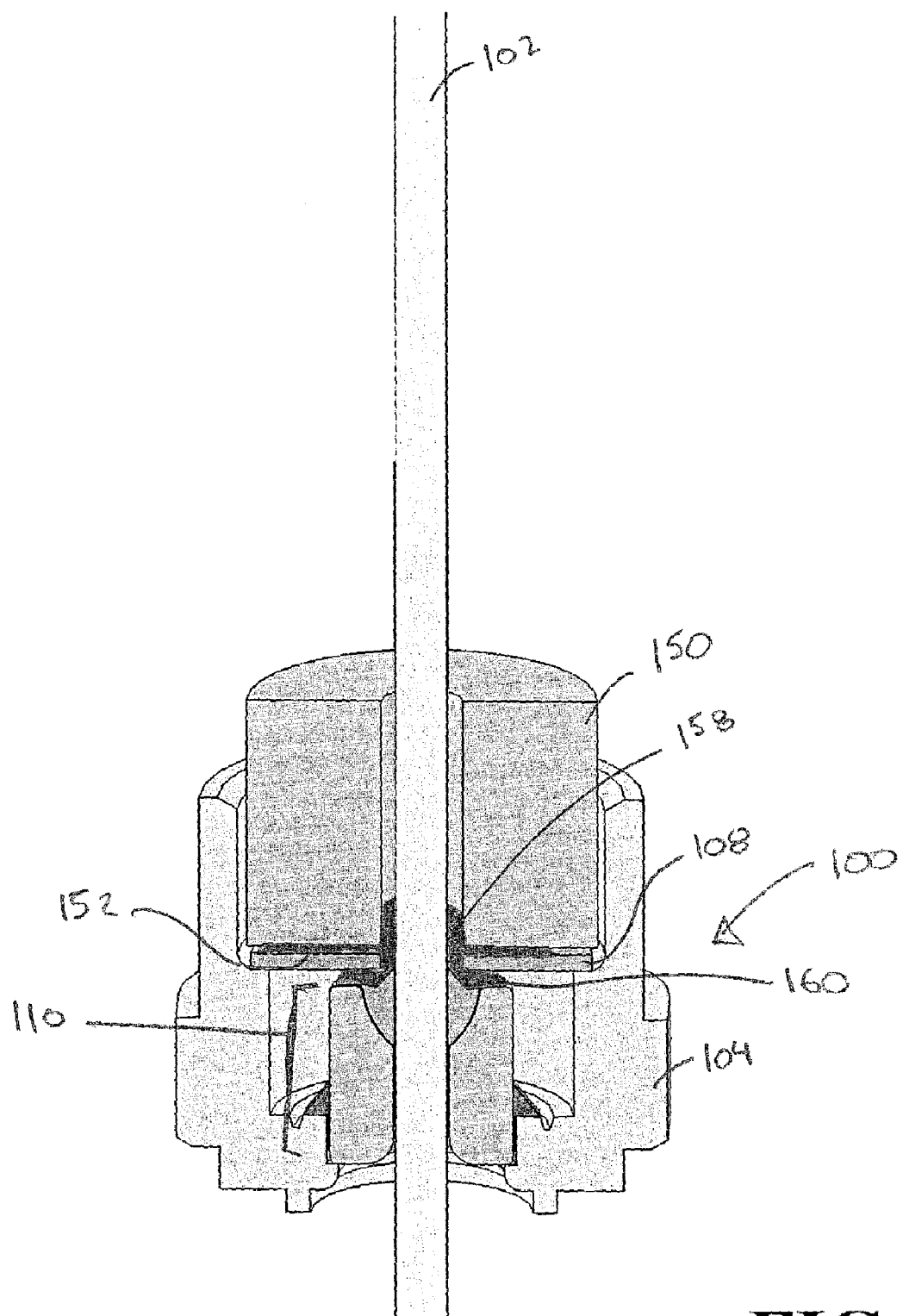

Terminal pin 102 provides a conductive path from the interior of a medical device (not shown) to one or more lead wires exterior to the medical device. As described previously, these lead wires are known to act as antennae that collect stray electromagnetic interference (EMI) signals, which may interfere with the proper operation of the device. To suppress and/or transfer such EMI signals to the container of the medical device, a discrete discoidal capacitor may be attached to feedthrough assembly 100. In particular, the capacitor may be disposed around and electrically coupled to terminal pin 102 and fixedly coupled to supporting structure 108. FIGS. 3-5 illustrate a known manner of attaching a discrete discoidal capacitor 150 to feedthrough assembly 100 shown in FIGS. 1 and 2. The attachment method commences as a ring-shaped preform 152 of non-conductive epoxy is threaded over terminal pin 102 (indicated in FIG. 3 by arrow 154). Capacitor 150 is then threaded over pin 102 and positioned against epoxy preform 152 such that preform 152 is sandwiched between capacitor 150 and supporting structure 108. Next, feedthrough assembly 100 is placed within a curing oven and heated to a predetermined temperature (e.g., approximately 175 degrees Celsius) to thermally cure preform 152 (indicated in FIG. 4 by arrows 156) and thus physically couple capacitor 150 to supporting structure 108.

During curing, preform 152 melts and disperses under the weight of capacitor 150, which moves downward toward supporting structure 108. Preform 152 disperses along the annular space provided between the bottom surface of capacitor 150 and the upper surface of supporting structure 108 to physically couple capacitor 150 and supporting structure 108 as described above. In addition, preform 152 may disperse upward into the annular space provided between the inner surface of capacitor 150 and outer surface of terminal pin 102 (shown in FIG. 5 at 158). Dispersal of preform 152 in this manner may interfere with the proper electrical coupling of capacitor 150 to terminal pin 102. Also during curing, preform 152 may disperse downward into insulating structure 110 (shown in FIG. 5 at 160). This dispersal may result in preform 152 covering any cracks that have formed through braze joint 110 and, consequently, prevent the accurate leak testing of feedthrough assembly 100. The inventive attachment method, which is described below in conjunction with FIGS. 6-8, overcomes these drawbacks by physically confining the flow of the epoxy preform to the annular space between the capacitor and supporting structure 108.

Figure 6:
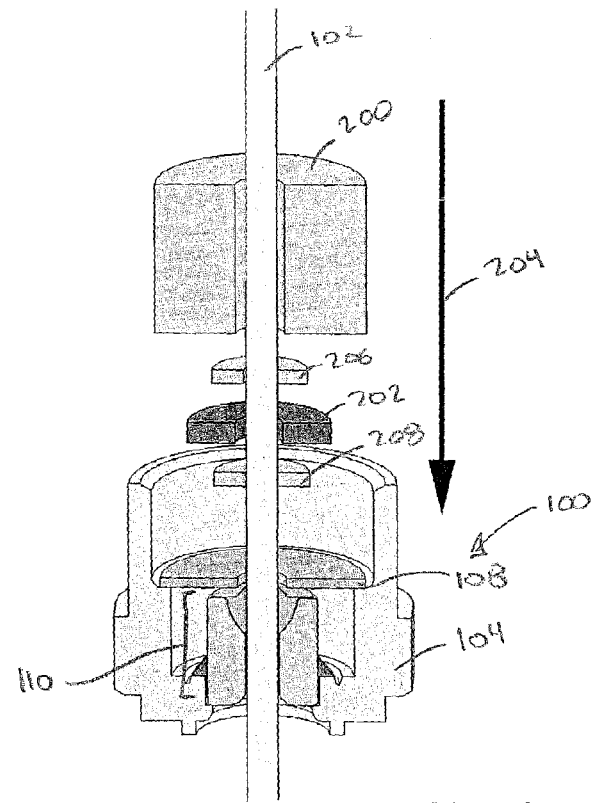
FIGS. 6-8 illustrate a method of attaching a discrete discoidal capacitor to the feedthrough assembly shown in FIGS. 1 and 2 in accordance with a first exemplary embodiment of the present invention.
Figure 7:
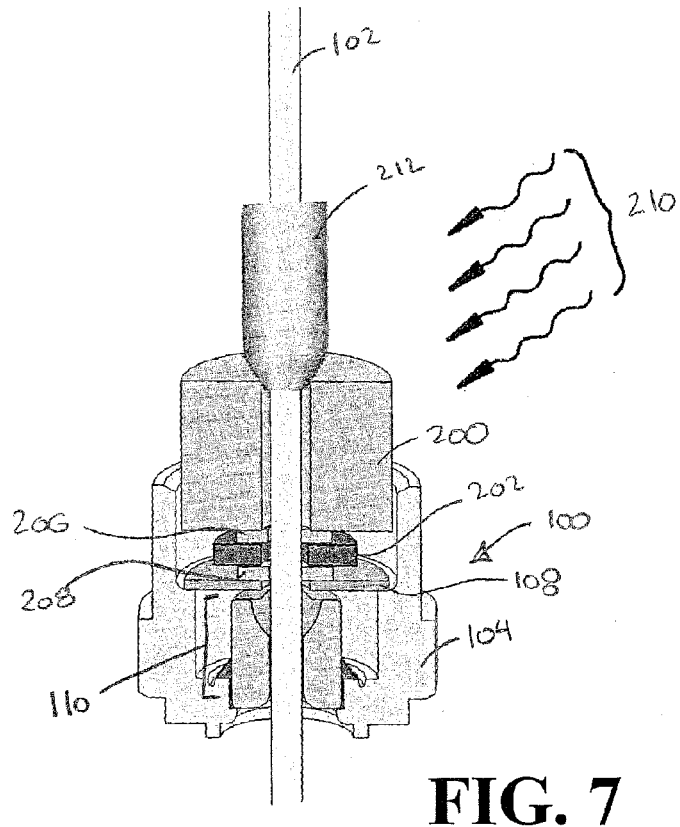
Figure 8:
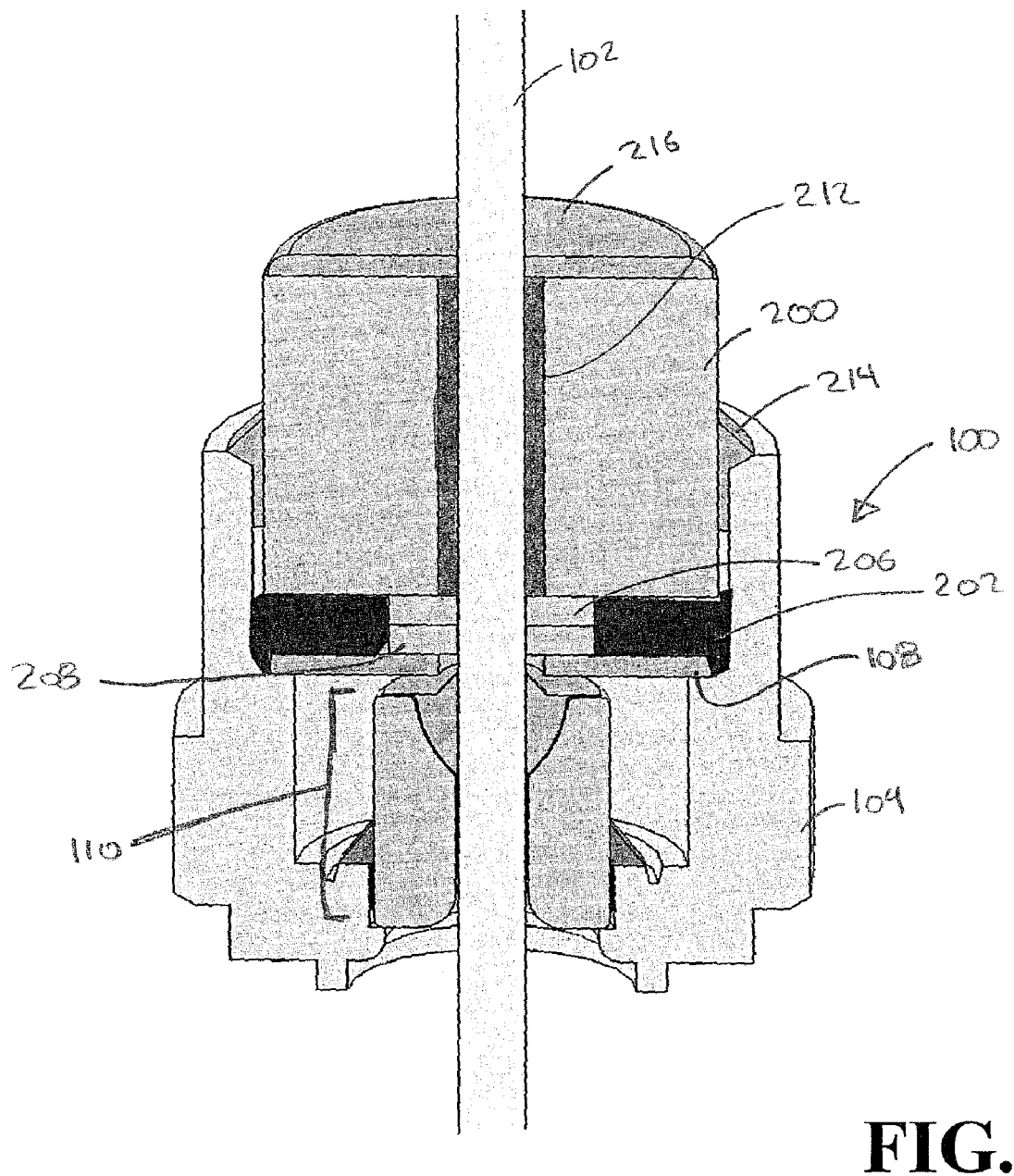

FIGS. 6-8 illustrate a method of attaching a discoidal capacitor 200 to feedthrough assembly 100 shown in FIGS. 1 and 2 in accordance with a first exemplary embodiment of the present invention. As was the case previously, attachment is achieved through the curing of a non-conductive epoxy preform 202. In contrast to the attachment method described above, however, a first washer 208 is inserted over terminal pin 102 before preform 202 is threaded over pin 102. In addition, a second washer 206 is inserted over pin 102 after preform 202 is so threaded. This results in the stacked configuration shown in FIG. 7 wherein preform 202 is sandwiched between washers 206 and 208, which are, in turn, collectively sandwiched between capacitor 200 and supporting structure 108. Washers 206 and 208 may be substantially identical, or may vary in dimensions, composition, etc. Each washer is preferably made from a material having moderate to high rigidity, that is non-conductive, and that may readily adhere to epoxy preform 202 while not impeding the flow of preform 202 during curing. Such materials may include, but are not limited to, various ceramics, polyimide, polyetheretherketone (PEEK), and alumina. The inner diameters of washers 206 and 208 are preferably only minimally larger than the outer diameter of pin 102. For example, if pin 102 has an outer diameter of approximately 0.0152 inch, the inner diameter of washer 206 and/or washer 208 may be approximately 0.0155 inch. Lastly, and by way of example only, washer 206 and/or washer 208 may have an outer diameter of approximately 0.050 inch and a thickness of approximately 0.007 inch.

After washer 208, epoxy preform 202, washer 206, and capacitor 200 have been threaded over terminal pin 102, feedthrough 100 may be placed within a curing oven and heated to cure preform 202 (indicated in FIG. 7 by arrows 210). As was the case previously, this causes preform 202 to melt and disperse between the lower surface of capacitor 200 and the upper surface of supporting structure 108. If desired, a weight, such as weight 212 shown in FIG. 7, may be placed atop capacitor 200 to promote the dispersal of preform 202. Importantly, washer 206 physically prevents preform 202 from wicking upward into the annular space between capacitor 200 and pin 102, and washer 208 physically prevents preform 202 from seeping into insulating structure 110 during curing. The result of this controlled dispersal may be more fully appreciated by referring to FIG. 8, which illustrates feedthrough assembly 100 after epoxy preform 202 is fully cured. Thus, it should be appreciated, that the attachment method illustrated in FIGS. 6-8 overcomes the drawbacks associated with prior art attachment methods thereby preserving the integrity of the electrical connection between capacitor 200 and terminal pin 102 and maintaining the leak-testability of feedthrough assembly 100. In addition, because the annular space between the bottom of capacitor 200 and the upper surface of supporting structure 108 is a fixed value, the inventive capacitor attachment method allows the precise volume of epoxy required for capacitor attachment to be accurately calculated. The precise volume of epoxy required for attachment could not previously be accurately determined as the amount of epoxy that would wick upward into the space between capacitor 200 and pin 102 and/or the amount of epoxy that would seep downward into the space beneath supporting structure 108 was overly difficult to predict. By allowing the volume of epoxy required for attachment to be determined, the inventive method facilitates the automation of the attachment process.

Attachment of capacitor 200 to the remainder of feedthrough assembly 100 may be completed in the following manner. First, a conductive material (e.g., epoxy, polyimide, solder, etc.) 212 is dispensed into the annular cavity provided between pin 102 and capacitor 200 to electrically couple pin 102 to the inner electrode plates of capacitor 200. A second thermal curing step is then performed to cure conductive material 212 if material 212 comprises epoxy or polyimide or to reflow conductive material 212 if material 212 comprises solder. Next, an adhesive fillet 214 may be disposed around the outer periphery of capacitor 200 proximate ferrule 104 to further secure and electrically couple the outer electrode plates of capacitor 200 to ferrule 104. Lastly, a non-conductive top coat 216 (e.g., epoxy, polyimide, glass, etc.) may be applied to the upper surface of capacitor 200 to decrease the likelihood of high-voltage breakdown. Once properly installed, capacitor 200 functions to permit passage of relatively low frequency electrical signals along terminal pin 102 while shunting undesired high frequency interference signals to the container of a medical device to which ferrule 104 is coupled.

Figure 9:
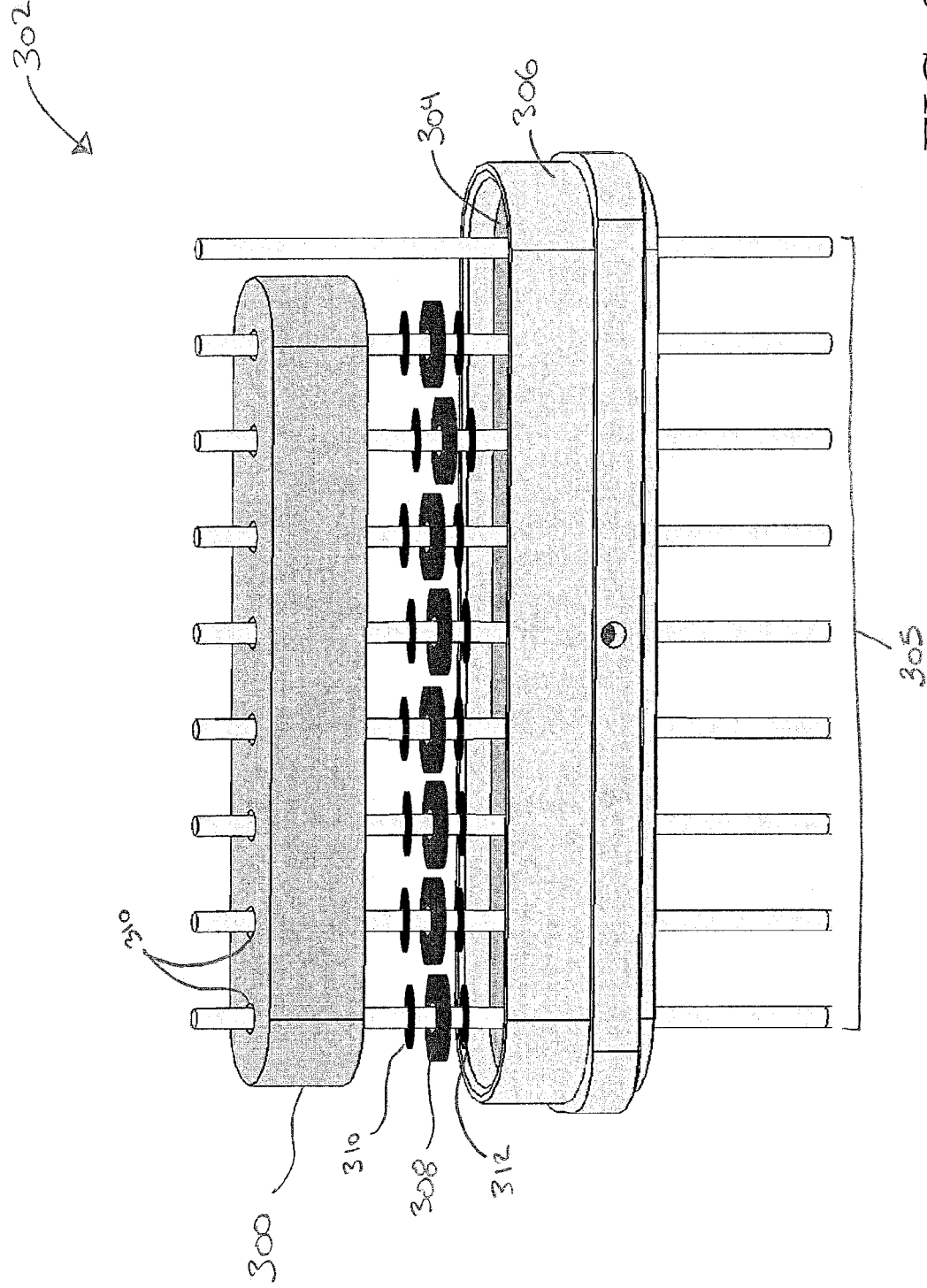
FIG. 9 is an exploded view of a multipolar feedthrough assembly illustrating the attachment of a monolithic discoidal capacitor in accordance with a second embodiment of the present invention.

FIG. 9 illustrates the attachment of a monolithic discoidal capacitor 300 to a multipolar feedthrough assembly 302 in accordance with a second embodiment of the present invention. Feedthrough assembly 302 comprises a ferrule 306 and an insulating structure 304 disposed within ferrule 306. Feedthrough assembly 302 guides an array of terminal pins 305 through the container of a medical device to which ferrule 304 is coupled (shown in FIG. 11). As described above, terminal pin array 305 and the lead wires to which array 205 is coupled may act as an antenna and collect undesirable EMI signals. Monolithic discoidal capacitor 300 may be attached to feedthrough assembly 302 to provide EMI filtering. Capacitor 300 is provided with a plurality of terminal pin-receiving apertures 310 therethrough. Capacitor 300 is inserted over terminal pin array 305 such that each pin in array 305 is received by a different aperture 310 and placed in an abutting relationship with insulating structure 304. If desired, one terminal pin in array 305 may be left unfiltered as shown in FIG. 9 to serve as an RF antenna. Capacitor 300 may be attached to insulating structure 304 by thermally curing, for example, a plurality of epoxy preforms 308. As was the case previously, a washer 310 may be disposed between capacitor 300 and each of preforms 308 to prevent the epoxy from wicking upward into apertures 310. Alternatively or conjunctively, a washer 312 may be disposed between insulating structure 304 and each of preforms to prevent the epoxy from seeping into insulating structure 304.

Figure 10:
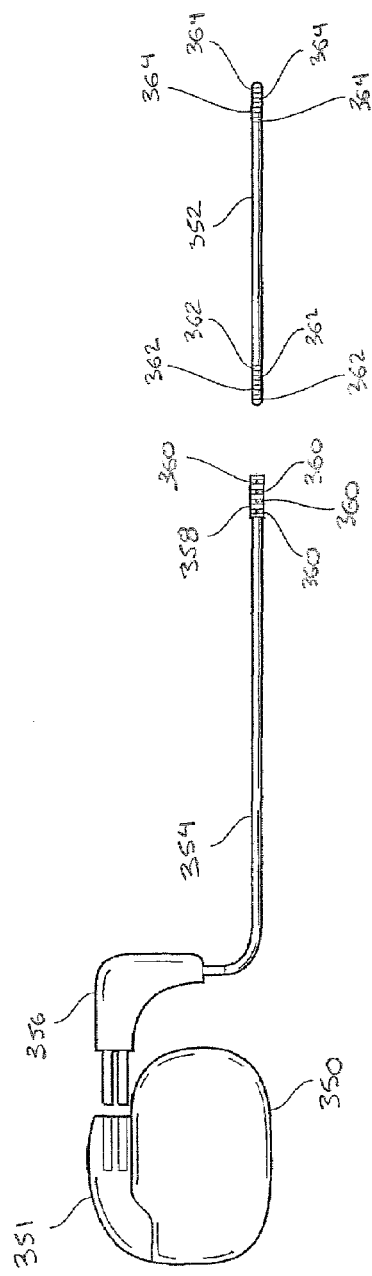
FIG. 10 an exploded view of an implantable medical device.

FIG. 10 is an exploded view of an implantable medical device (e.g., a pulse generator) 350 coupled to a connector block 351 and a lead 352 by way of an extension 354. The proximal portion of extension 354 comprises a connector 356 configured to be received or plugged into connector block 351, and the distal end of extension 354 likewise comprises a connector 358 including internal electrical contacts 360 configured to receive the proximal end of lead 352 having electrical contacts 362 thereon. The distal end of lead 352 includes distal electrodes 364, which may deliver electrical pulses to target areas in a patient's body (or sense signals generated in the patient's body; e.g., cardiac signals).

Figure 11:
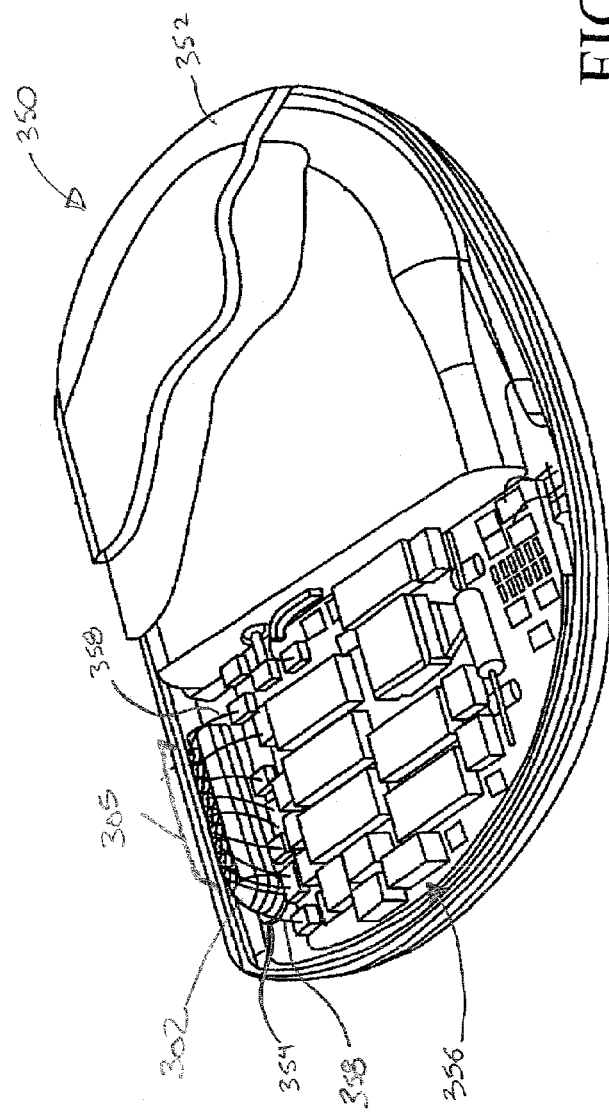
FIG. 11 is an isometric cutaway view of an implantable medical device incorporating the feedthrough assembly shown in FIG. 9.

After a capacitor 300 has been attached to feedthrough assembly 302 in the manner described above, assembly 302 may be welded to the housing of an implantable medical device 350 as shown in FIG. 11. Medical device 350 comprises a container 352 (e.g. titanium or other biocompatible material) having an aperture 354 therein through which feedthrough assembly 302 is disposed. As can be seen, each terminal pin in array 305 has been trimmed and is electrically connected to circuitry 356 of device 350 via a plurality of connective wires 358 (e.g., gold), which may be coupled to terminal pin array 305 by wire bonding, laser ribbon bonding, or the like. After installation, feedthrough assembly 302 and capacitor 300 collectively function to permit the transmission of relatively low frequency electrical signals along the terminal pins in array 305 to circuitry 356 while shunting undesired high frequency EMI signals to container 352 of device 350.

Although the inventive filtered feedthrough assembly and method for the assembly thereof have been described above as utilizing two washers per terminal pin, it should be appreciated that only one washer may be utilized and disposed either between the capacitor and the preform or the supporting structure and the preform. Indeed, in the case of a unipolar feedthrough assembly wherein the aperture through the supporting structure may be narrowly tailored to conform to the outer diameter of the terminal pin, disposing a washer between the supporting structure and the preform may be largely unnecessary. It should also be appreciated that, although the inventive method for attaching a capacitor to a feedthrough assembly has been described as utilizing one or more epoxy preforms to physically couple the capacitor to the feedthrough assembly, other adhesives may be used. If a liquid epoxy (e.g., UV cure epoxy) is employed, it may be desirable to physically couple a washer to the capacitor before threading the capacitor over the terminal pin or pins and immediately curing the assembly after the capacitor/washer combination is properly positioned. This will help prevent the liquid epoxy from being entirely forced out from between the capacitor/washer combination and the supporting structure or other washer. Lastly, it should be understood that, although the insulating structures in the exemplary feedthrough assemblies described above employed one or more braze joints, other types of joint-insulator sub-assemblies may be utilized providing that the sub-assembly or assemblies utilized are biocompatible and form a suitable hermetic seal between the insulator pin and ferrule.

It should also be understood that curing processes other than the thermal curing described above may be utilized. For example, if a UV-curable epoxy is used for the liquid epoxy or the epoxy preform, a UV snap cure process may be performed to effectuate capacitor attachment. UV curing occurs as the UV-curable epoxy is exposed to a UV light source (e.g., emitting light having a wavelength of approximately 200-300 nanometers) for a predetermined period of time (e.g., approximately 30-40 seconds). Though the UV light may only directly reach the portions of the epoxy exposed through the annular cavity formed between the outer diameter of the capacitor and the inner wall of the ferrule, the UV-curing process will also affect neighboring portions of epoxy that are not directly exposed to the UV light. Exposure to UV light causes the epoxy to undergo a cross-linking process, harden, and consequently couple the capacitor or capacitors to the feedthrough assembly.

It should thus be appreciated from the foregoing that there has been provided filtered feedthrough assembly utilizing an improved capacitor attachment technique that prevents the non-conductive epoxy from undesired travel thereby preserving the integrity of the electrical connection between the capacitors and the terminal pins and the leak testability of the feedthrough assembly. Although the invention has been described with reference to a specific embodiment in the foregoing specification, it should be appreciated that various modifications and changes can be made without departing from the scope of the invention as set forth in the appended claims. Accordingly, the specification and figures should be regarded as illustrative rather than restrictive, and all such modifications are intended to be included within the scope of the present invention.

The invention claimed is:

1. A method for attaching a capacitor to a feedthrough assembly of a medical device, the feedthrough assembly comprising a ferrule configured to be coupled to the medical device and an insulating structure disposed within the ferrule for insulatively guiding at least one terminal pin through the ferrule, the method comprising:
    providing a capacitor support structure within the ferrule surrounding the terminal pin and overlaying the insulating structure;
    threading a first washer over the terminal pin to overlay the capacitor support surface;
    placing a body of epoxy in contact with the first washer;
    threading a second washer over the terminal pin to abut the body of epoxy;
    positioning the capacitor over the terminal pin such that the first washer, the body of epoxy, and the second washer are between the capacitor and the capacitor support structure overlaying the insulating structure; and
    curing the body of epoxy to couple the capacitor to the insulating structure.

2. The method according to claim 1 wherein the step of placing comprises placing an epoxy preform over the terminal pin to abut the first washer.

3. The method for attaching a capacitor according to claim 2 wherein the step of threading a first washer over the terminal pin is performed prior to placing the epoxy preform over the terminal pin.

4. The method for attaching a capacitor according to claim 1 further comprising placing a weight on the capacitor to facilitate the dispersal of the epoxy during the curing of the feedthrough assembly.

5. The method for attaching a capacitor according to claim 1 further comprising:
    determining a post-attachment spatial volume between the capacitor and the insulating structure; and
    selecting a body of epoxy having substantially the same volume as the determined spatial volume.

6. The method for attaching a capacitor according to claim 1 further comprising leak testing the feedthrough assembly after curing.

7. A method for attaching a capacitor to a feedthrough assembly of a medical device, the feedthrough assembly comprising a ferrule configured to be coupled to the medical device and an insulating structure disposed within the ferrule for insulatively guiding at least one terminal pin through the ferrule, the method comprising:
    providing a capacitor support structure within the ferrule surrounding the terminal pin and overlaying the insulating structure;
    threading a first washer over the terminal pin to overlay the capacitor support surface;
    determining a post-attachment spatial volume between the capacitor and the insulating structure;
    selecting a body of epoxy having substantially the same volume as the determined spatial volume;
    placing the body of epoxy in contact with the first washer;
    positioning the capacitor over the terminal pin such that the first washer and the body of epoxy are between the capacitor and the capacitor support structure overlaying the insulating structure; and
    curing the body of epoxy to couple the capacitor to the insulating structure.

8. The method according to claim 7 wherein the step of placing comprises placing an epoxy preform over the terminal pin to abut the first washer.

9. The method for attaching a capacitor according to claim 8 wherein the step of threading a first washer over the terminal pin is performed prior to placing the epoxy preform over the terminal pin.

10. The method for attaching a capacitor according to claim 7 further comprising placing a weight on the capacitor to facilitate the dispersal of the epoxy during the curing of the feedthrough assembly.

11. The method for attaching a capacitor according to claim 7 further comprising leak testing the feedthrough assembly after curing.

* * * * *